(No Model.)
J. W. NAUGHTON.
PROCESS OF MAKING ELECTROTYPE PLATES.
No. 529,078. Patented Nov. 13, 1894.
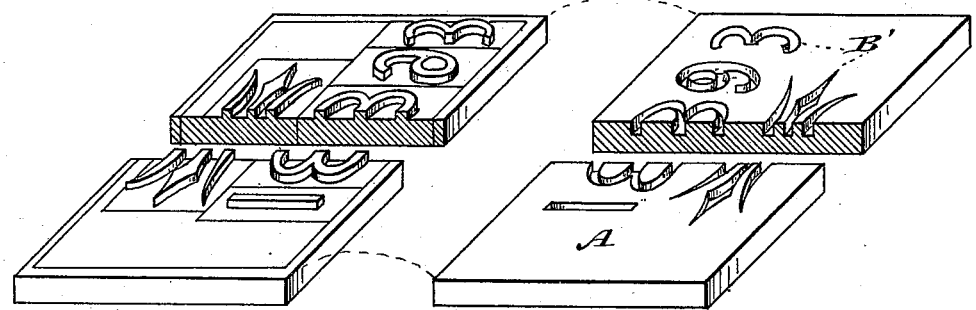
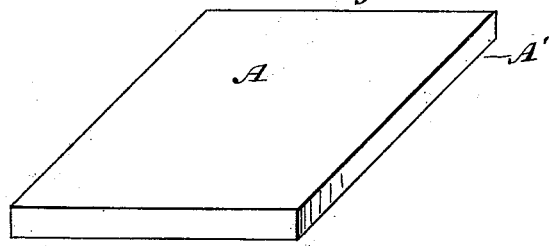
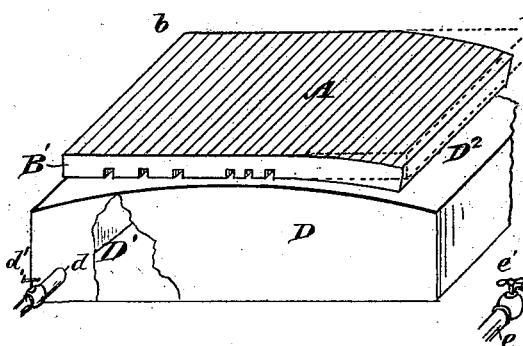
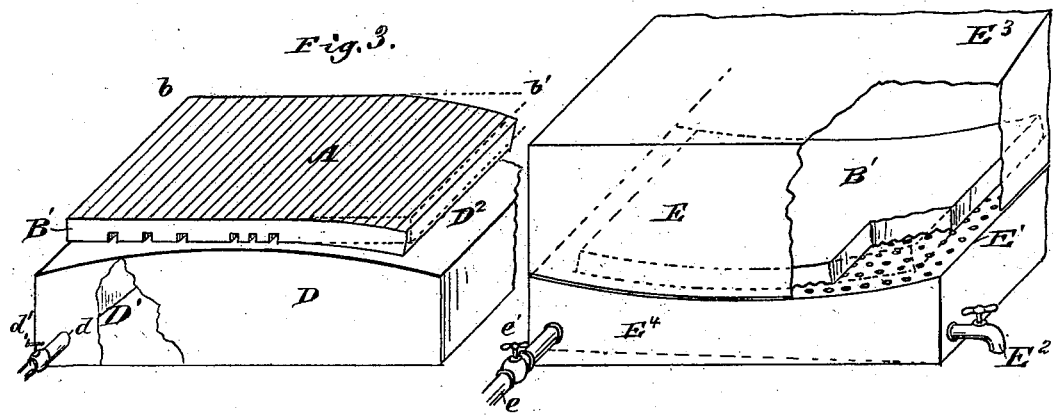
Witnesses
L. N. Legendre
Henry Gray
Inventor
John W. Naughton
by
Stephen J. Cox
Attorneys

UNITED STATES PATENT OFFICE.

JOHN W. NAUGHTON, OF NEW YORK, N. Y.

PROCESS OF MAKING ELECTROTYPE-PLATES.

SPECIFICATION forming part of Letters Patent No. 529,078, dated November 13, 1894.

Application filed April 4, 1893. Serial No. 469,040. (No model.)

*To all whom it may concern:*

Be it known that I, JOHN W. NAUGHTON, a citizen of the United States, residing in the city of New York, county and State of New York, have invented a new and useful Improvement in the Art and Process of Electrotyping, of which the following is a full, clear, and true description, enabling others skilled in the art to which it pertains to make and use the same.

My invention relates to the art of electrotyping in general. In the following description it is more specifically described in connection with plates, for newspaper printing, such as those used upon cylinders and require to be curved in order to be adjusted to the same. Its object is to reduce the amount of time and labor necessary in the production of electrotype plates, to obviate the necessity of building up, to eliminate the use of graphite, or plumbago, and produce a sharper, cleaner impression, as described more fully further on and illustrated in the accompanying drawings, in which like letters refer to like parts in each.

Figure 1 is a perspective view of a metallic plate. Fig. 2 is a perspective view of a matrix formed in a metallic plate from the form B. Fig. 3 is a perspective view of a box having a curvature upon its upper surface, the same curvature representing the curvature of the cylinder upon which the plate lying upon its surface is required to be used. Fig. 4 is a perspective view of a sweat box, having a curved and perforated diaphragm within it, said curve being a duplicate of the curve of the cylinder upon which the plate, placed in said box, is to be used.

The art of electrotyping type forms, and other plates for printing purposes, consists in impressing the same in a wax, or a composition of wax and other substances by means of pressure, such portions of the impression or matrix as are shallow, and the edges, are raised or built up as it is called in the art by adding melted wax to these parts.

In the application herewith presented, a wide divergence from the present process will be readily observed. A metallic plate, A, Fig. 1, is prepared, having a smooth surface upon one or both sides. This metallic plate A is placed upon, or under the form and a sufficient amount of heat to render the plate plastic is induced upon it. The form B, Fig. 2, is now adjusted over the plate A and a pressure exerted upon it, sufficient to force the type or other matter of which the form may be composed, into the plastic metallic plate A, which, as before stated, is heated to a plastic condition. When a sufficient amount of pressure has been exerted, the plate A is allowed to cool and the form B is removed therefrom.

No especial care need be taken to prevent a lateral motion of the form, as the possibility of injury to the matrix B' is remote, as when cooled the plate A is hardened to a condition equal to type itself.

The plate A may be placed upon the form and the same result be attained by passing a roller over it while in a plastic condition. The matrix so formed in the metal plate A by a combination of pressure and heat, from the form B, is now placed upon the forming table D. This table has a hollow top D' into which steam or other means of heating may be introduced. The matrix B' is placed with the molded face downward upon the curved upper surface $D^2$ of the forming table D. When the matrix is first placed upon the table in proper position the central portion only comes in contact with the rounded part of the table and the line $b$, $b'$ drawn from one end of the matrix to the other would be parallel with a line representing the chord of an arc formed by the line of the curvature of the table. A moderate amount of heat is now permitted to enter the hollow top D' of the table D through the heat pipe $d$ under control of valve $d'$, and this communicates with the matrix B', rendering it plastic. This plastic condition permits the ends of the matrix to assume by gravity the curvature of the table $D^2$. To illustrate this point, in Fig. 3 one end of the matrix is shown as having assumed the curvature of the table top, while the other is in a horizontal position. The heat is now turned off from the table top and the matrix is permitted to cool as rapidly as possible by the application of cold water, or any other means, and it is now ready to be submitted to the usual electro-plating bath. The exposed metallic face of the matrix is the portion upon which the precipitation of copper or other metal used in the bath, will adhere, and a shell is quickly formed upon it, of sufficient thickness to handle with safety. The formation of this shell will depend upon the strength of the bath and other conditions with which this patent has nothing to do. When the shell is of sufficient thickness to be handled with safety, it, with the matrix attached thereto, is taken from the bath and placed in the box E, Fig. 4, having a foraminated and curved diaphragm, the curvature of the diaphragm corresponding with the curved top of the table D and the curvature of the matrix B'. The cover $E^3$ of the box E is now closed and heated vapor is permitted to enter beneath the diaphragm of the box through the heat pipe $e$, controlled by the valve $e'$. The heat thus introduced quickly liquifies the metallic matrix and by gravity, it falls through the foraminations in the diaphragm E' to the bottom of the box. This bottom of the box $E^4$ is deflected from a horizontal line so as to admit of substances falling upon its surface to run to one end, where they may be drawn off through the cock $E^2$. The electrotype shell is now in a condition to be tinned and backed up by the usual methods employed at present and well understood in the art.

In experimenting upon metals of which the matrix plate A is made, I have found a number of metallic combinations that will accomplish the same result, but for plasticity at a low temperature, economy and rapidity of action, I prefer a metal made of two parts bismuth, one lead and one tin, which becomes plastic at a temperature of 200° or less, but I do not confine myself to this formula. Nor do I confine myself to the exact mechanical constructions shown in the drawings in carrying out my process.

What I do claim, and desire to secure by Letters Patent, is—

1. In the art of electrotyping the process herein described of forming the matrix of a form in metal; which consists in pressing the said form into metal made plastic by heat, of cooling the matrix so formed, of removing it from the form, and bending or curving it to the required shape, by placing it upon a suitable shaped former and applying to it sufficient heat to cause it to assume the shape of the said former by gravity, as herein shown and described.

2. In the art and process of electrotyping, the process of constructing plates, and forming matrices in said plates to be used in electrotyping herein described, which consists in combining and constructing plates of a combination of two, or more metals, in such proportions, that while said plates are normally rigid, they become plastic at a low temperature, of forming by pressure in such plates while plastic impressions of type forms, said impressions on said plates, when the plates are removed from the forms being adapted to be used as matrices for the reproduction of said form by electrotyping, as herein shown and described.

3. In the art of electrotyping, the process of bending or curving metallic matrices herein described, which consists in placing the matrix upon a former having the desired shape, and inducing sufficient heat upon the said matrix to render it plastic, and in this condition by gravity conform to the curvature of the former, as herein shown and described.

4. In the art of electrotyping, the process herein described, which consists in first forming plates of metals so combined that while normally they are rigid, under the influence of heat they become plastic, of causing an impression to be made in the said plate while in such condition by placing them upon, or under type forms, and inducing a pressure upon them sufficient to cause the plastic metal of the plates to enter into the interstices of said type form, of removing the impressions or matrices so formed when cooled to a normal temperature, and bending or curving them before electrotyping them, by placing them upon a former adapted for the purpose and inducing a sufficient amount of heat upon them to render them plastic and admit of their assuming the curvature of the former, as herein shown and described.

JOHN W. NAUGHTON.

Witnesses:
FRANK E. COX,
HENRY GRAY.